(12) United States Patent
Newberg

(10) Patent No.: US 6,786,470 B2
(45) Date of Patent: Sep. 7, 2004

(54) CIRCUMFERENTIAL SEALING DIAPHRAGM VALVE

(76) Inventor: Douglas A. Newberg, 37 Ashford Dr., Plainsboro, NJ (US) 08536

( * ) Notice: Subject to any disclaimer, the term of this patent is extended or adjusted under 35 U.S.C. 154(b) by 0 days.

(21) Appl. No.: 10/077,878

(22) Filed: Feb. 20, 2002

(65) Prior Publication Data

US 2002/0113223 A1 Aug. 22, 2002

Related U.S. Application Data

(60) Provisional application No. 60/269,335, filed on Feb. 20, 2001.

(51) Int. Cl.[7] .............................................. F16K 31/00
(52) U.S. Cl. .................................... 251/331; 251/335.2
(58) Field of Search ............................. 251/331, 335.2

(56) References Cited

U.S. PATENT DOCUMENTS

| | | |
|---|---|---|
| 3,078,066 A | 2/1963 | Moore |
| 3,134,570 A | 5/1964 | Jarrett |
| 3,812,398 A | 5/1974 | Kozel et al. |
| 4,128,227 A * | 12/1978 | Blomqvist .................. 251/331 |
| 4,199,850 A | 4/1980 | Velan |
| 4,750,709 A | 6/1988 | Kolenc et al. |
| 4,819,691 A | 4/1989 | Lofgren et al. |
| 4,979,527 A | 12/1990 | Mueller et al. |
| 5,152,500 A | 10/1992 | Hoobyar et al. |
| 5,288,052 A | 2/1994 | Black et al. |
| 5,474,303 A | 12/1995 | Coles |
| 5,549,134 A | 8/1996 | Browne et al. |
| 5,758,864 A | 6/1998 | Asai |
| 5,771,924 A | 6/1998 | Huygen |
| 5,820,105 A | 10/1998 | Yamaji et al. |
| 5,865,423 A | 2/1999 | Barber et al. |
| 5,971,025 A | 10/1999 | Backlund |
| 6,092,550 A | 7/2000 | Gotch et al. |
| 6,123,320 A | 9/2000 | Rasanow et al. |
| 6,394,417 B1 | 5/2002 | Browne et al. |

FOREIGN PATENT DOCUMENTS

GB          1 571 848      * 7/1980 ................. 251/331

OTHER PUBLICATIONS

Pharmaceutical Processing, New Technology For the Pharmaceutical Industry; Sep. 2001; p. 80.

* cited by examiner

Primary Examiner—John Bastianelli
(74) Attorney, Agent, or Firm—Birch, Stewart, Kolasch & Birch, LLP

(57) ABSTRACT

A valve body for a valve includes a body having an internal cavity formed therein. An inlet passage and an outlet passage are formed in the body. The inlet passage has an inlet opening in communication with the internal cavity, and the outlet passage has an outlet opening in communication with the internal cavity. A circumferential sealing surface is formed on a wall of the internal cavity. The circumferential sealing surface extends between the inlet opening and the outlet opening and circumferentially around the internal cavity. Furthermore, a bottom line extending through the inlet passage, the internal cavity and the outlet passage forms a coplanar surface to allow for free-drainage of the body.

36 Claims, 11 Drawing Sheets

CIRCUMFERENTIAL SEALING DIAPHRAGM VALVE

CROSS-REFERENCE TO RELATED APPLICATIONS

This application claims priority under 35 U.S.C. §119(e) to U.S. Provisional Application No. 60/269,335, filed on Feb. 20, 2001, the entirety of which is hereby incorporated by reference.

BACKGROUND OF THE INVENTION

1. Field of the Invention

The present invention relates to diaphragm valves. In particular, the present invention relates to diaphragm valves which allow for free-drainage of a valve body of the valve when the valve is in the open position.

2. Description of Background Art

The demand for higher quality products forces industries to continually reevaluate fundamental and basic elements of their processes in a search to discover new methods and better components that will yield greater uniformity with higher levels of reproducibility in order to achieve the quality desired. Evaluation of inspection results by United States Food and Drug Administration (FDA) inspectors in recent years has caused that agency to push industry to focus on cleaning validation and, of particular relevance to this disclosure, the cleanability of equipment, a large part of which is sanitary valving. Among the concerns are that some equipment in these processes may not be adequately cleanable in place, that in-situ cleaning procedures are not themselves adequate to clean the equipment installed or that the procedures and equipment are appropriately matched, but the procedures are not being properly executed.

Valves are by far the largest category of equipment used in processes. Relative to other existing valve designs, weir-style diaphragm valves are simple, provide good process isolation, cost-effective to install and maintain and because they were thought to be easily and reliably cleanable in place. Unlike several other categories of valve designs, weir diaphragm valves generally offer good drainability with little hold-up of material when properly installed. For these reasons they have, over the last fifty years, become the valve of choice for use in hygienic processes.

In recent years the performance of these valves has been subject to much greater and closer scrutiny, at least in part due to pressure from FDA. While still the preferred choice for some applications, it has become apparent that weir diaphragm valves can pose a significant risk as a source of cross over contamination, particularly if improperly installed, operated and maintained or if clean-in-place and sterilize-in-place procedures are not properly followed. These concerns stem from the basic design of weir diaphragm valves. Referring to FIG. 10 of the present invention, a typical weir diaphragm valve 101 is illustrated. The weir diaphragm valve 101 includes a valve body 103, a diaphragm 133 and a bonnet, as well as other typical valve components (all not shown).

In FIG. 10, a static perimeter or circumferential seal 136 is formed between the valve body 103 and the bonnet by a perimeter of the diaphragm 133. Furthermore, a dynamic line seal 137 is formed along a weir 140. The main problem with the weir diaphragm valve design is that the static circumferential seal 136 is continuous with the line seal 137 made by the diaphragm 133 across the top of the weir 140. When the center portion of the diaphragm 133 is raised to break the line seal 137 across the weir 144 to allow for flow through the valve, pressure is applied to the inner edge of the diaphragm 133 where it forms the static circumferential seal 136 with the valve body 103. Accordingly, a portion of the static circumferential seal 136 is also raised. When the line seal 137 is reformed across the weir 140 by lowering the diaphragm 133, material is trapped between the inner edge of the diaphragm 133 and the valve body 103, i.e., within the static circumferential seal 136. This trapped material may migrate back into the internal cavity 113 of the valve body 103 over time. Although this may be less of a problem while a batch of a process is in progress, not completely removing the trapped residual during cleaning procedures between batches is a more serious issue and may be considered very critical between campaigns of different products by the FDA.

In addition to the above, weir valves in the past were typically used in an orientation where the flow through the valve proceeded from the inlet passage to the outlet passage by flowing vertically over the weir 140. Accordingly, material would be trapped on the upstream side of the internal cavity 113. This of course causes cross contamination.

Manufacturers today, in an effort to improve drainage through their valves and minimize hold-up, recommend that weir diaphragm valves be cantilevered over onto the side so that fluids can flow passively around the weir and out, rather than vertically over the weir. While this is necessary in order to make weir valves drain, this also places a portion of the circumferential seal 136 at the bottom of the valve, causing it to become a sump where material will tend to collect and where complete drainage will be very difficult to fully achieve. Consequently, a more significant cleaning challenge and possible point source for cross contamination is exacerbated when using a weir valve in this manner. Several articles can be found through the literature on the subject of weir-style valve cleanability. One of the most recent is an article in Pharmaceutical Processing (September, 2001, pg. 80) in which the author, in a comparison study of weir valves and radial diaphragm valves, demonstrates that weir valves frequently do not become fully cleaned. In this study, radial diaphragm valves provided much higher clean-in-place reliability.

Accordingly, the primary alternative valve design to weir valves that has gained favor in many industries is the radial diaphragm valve, similar to the testing in the study mentioned above. FIG. 11 of the present invention illustrates a typical radial diaphragm valve 101. As with weir diaphragm valves, radial diaphragm valves include a flexing diaphragm 233 that allows the valve 201 to be opened and closed while segregating the mechanical elements of the valve 201 from the process. Radial diaphragm valves, however, differ from weir diaphragm valves in several important ways. The most important advantage radial diaphragm designs offer is that the static circumferential seal 236 between the valve body 203 in a radial diaphragm valve is not continuous with the dynamic seal 237, as is the case with weir valves. Since the two seals are not continuous, a radial diaphragm valve can be actuated without the circumferential seal 236 being affected. Accordingly, cross contamination as a result of residual hold-up in the circumferential seal 236 is effectively eliminated when compared to the weir diaphragm valve.

While it would seem that the solution to the cross contamination problems currently plaguing the industry could be resolved by radial diaphragm valves, it is a byproduct of the radial design that makes radial diaphragm valves a less perfect solution to the problem. As mentioned above, radial diaphragm valves are defined by the segregation of the circumferential seal 236 from the flow control or dynamic seal 237 and the passage it seals. A review of the background art will show that in the dynamic seal 237, the flow control passage 224 and the mating annular dynamic sealing surface 237 immediately about it are positioned at the center of the internal valve cavity. Accordingly, the flexible portion 241 of the diaphragm 233 between the static circumferential seal 236 and the dynamic seal 237 is enough to allow the necessary range of movement of the dynamic sealing tip 235 of the diaphragm 233 to seal the flow control passage 244, while minimizing stress on the flexible portion 241 of the diaphragm 233. In view of this, the portion of the diaphragm 233 which mates with the valve body 203 at the circumferential seal 236 is not lifted. Accordingly, material is not trapped in the circumferential seal as in a weir valve.

As can be readily understood, with the arrangement of radial diaphragm valve, an opening into the internal cavity 213 of one flow passage 226 is located radially outward from the centrally placed flow control passage 224 and radially inward from the circumferential seal 236. It will also be noted that the surface of both of these passages open into the valve internal cavity 213 through the same wall 242. The wall 242 is substantially planar or dished as illustrated in FIG. 11, and at least one of the axes of the flow passages tends to enter the internal cavity 213 at close to a right angle.

As a consequence of the combination of the orientation of the passages relative to the wall 242 of the internal cavity 213 through which they enter, the opening of one fluid passage 224 is positioned centrally in the internal cavity 213 with the other passage 226 positioned radially. Furthermore, both passages are within the circumferential seal 236. Accordingly to the background art, radial diaphragm valves can only be made to fully drain if they are oriented vertically, i.e., with the outlet at the bottom, and will only drain if the bottom of the outlet is adjacent the circumferential seal 236. Accordingly, in FIG. 11, it would be necessary to orient the valve 201 such that the passage 226 is oriented downward.

As can be readily understood, since radial diaphragm valves are only completely drainable if oriented in a vertical manner, there are severe limitation on how radial diaphragm valves found in the background are can effectively be used. Specifically, orienting a radial diaphragm valve in a vertical orientation results in a significant vertical drop across them. Due to the numerous valves required for some systems, orienting all of the valves in a vertical manner is not possible because of the space limitations. Accordingly, radial diaphragm valves have not displaced weir diaphragm valves in practice, in spite of the in-situ cleanability limitations of weir diaphragm valve designs.

SUMMARY OF THE INVENTION

Having described the strengths and weaknesses of the two predominant categories of valves used for hygienic processing, the present inventor would like to present a new alternative valve design that combines the best features of each of the design categories discussed above, while eliminating weaknesses. As will be seen in the present invention, it is possible to construct a valve design that can incorporate the desirable diaphragm sealing component wherein the dynamic seal is segregated from the static circumferential seal, where the process contact surfaces of the valve body and of the diaphragm are fully accessible to the process flow without the creation of pooling areas, breathing seals or additional crevice areas so that cleaning and sterilizing the valve in place can most effectively be achieved.

The present invention has the added benefit of being a compact design that may also be manufactured economically due, in part, to the open nature of the internal cavity and passages formed in the valve body. Furthermore, when constructed as an embodiment where inlet and outlet passages are coaxial, the present invention has the benefit of being bilaterally symmetrical, allowing it to be used, without modification and without any loss in operational effectiveness, in right- or left-handed applications, requiring only that the body be rotated. The valve of the present invention also provides improved flow with better self-cleaning and sterilizing characteristics because of the minimization of quiet zones and the sweeping scouring flow path that will be created as material flows into and out of the internal valve cavity.

It is a primary object of the present invention to provide a device that can be effectively cleaned and sterilized in place, where the process can effectively be isolated from the mechanical valve elements through the use of a diaphragm or other effective sealing members and where unobstructed free-drainage through the valve can still be achieved.

A further object of the present invention is to allow flow through the valve without requiring a step up or a step down of flow and to do so without the accumulation of material flow in the valve body as currently happens with background art radial diaphragm valves.

Yet another object of the invention is to provide a dynamic diaphragm seal for reversibly sealing off the flow of process through the valve that is separate and discrete from the static seal that forms between the diaphragm and the valve body such that when the dynamic seal is actuated, the static seal remains essentially unaffected. Accordingly, the static seal does not tend to accumulate and harbor materials along the seam between the diaphragm and the valve body as currently occurs with weir-style diaphragm valves.

Still another purpose of the present invention is to provide a design that can be effectively cleaned and sterilized in place.

Yet another purpose of this design is to provide a design that can be made with an o-ring seal or with a diaphragm seal.

Another object of this invention is to provide a device that can be easily is dismantled, inspected and maintained.

Another object of the present invention is to provide an apparatus that can be operated manually or automatically.

Still another object of the invention is to provide a device that can be modified and combined to form valve with inlets and outlets oriented at different angles from one another such as in the case of an "L" shaped valve, form valves with single or multiple inlets and/or outlets such as in the case of a "2-way" valve, form compound valves where a single body can combine several internal cavities, inlets and outlets which may or may not be interconnected.

The above objects of the present invention can be accomplished by providing a valve body with the following construction. A valve body having an internal cavity formed therein. An inlet passage and an outlet passage are formed in the body. The inlet passage has an inlet opening in communication with the internal cavity, and the outlet passage has an outlet opening in communication with the internal cavity. A circumferential sealing surface is formed on a wall of the internal cavity. At least a portion of the circumferential sealing surface extends between the inlet opening and the outlet opening and circumferentially around the internal cavity. Furthermore, a continuous unobstructed path for flow along the valve bottom extends through the inlet passage, the internal cavity and the outlet passage that forms a coplanar surface to allow for free-drainage of the body.

The valve of the present invention may be equipped with a radial diaphragm sealing element or an o-ring seal, may be actuated manually or automatically and may be formed as a single valve or ganged together as a flow control unit encompassing multiple flow pathways and multiple internal cavities.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
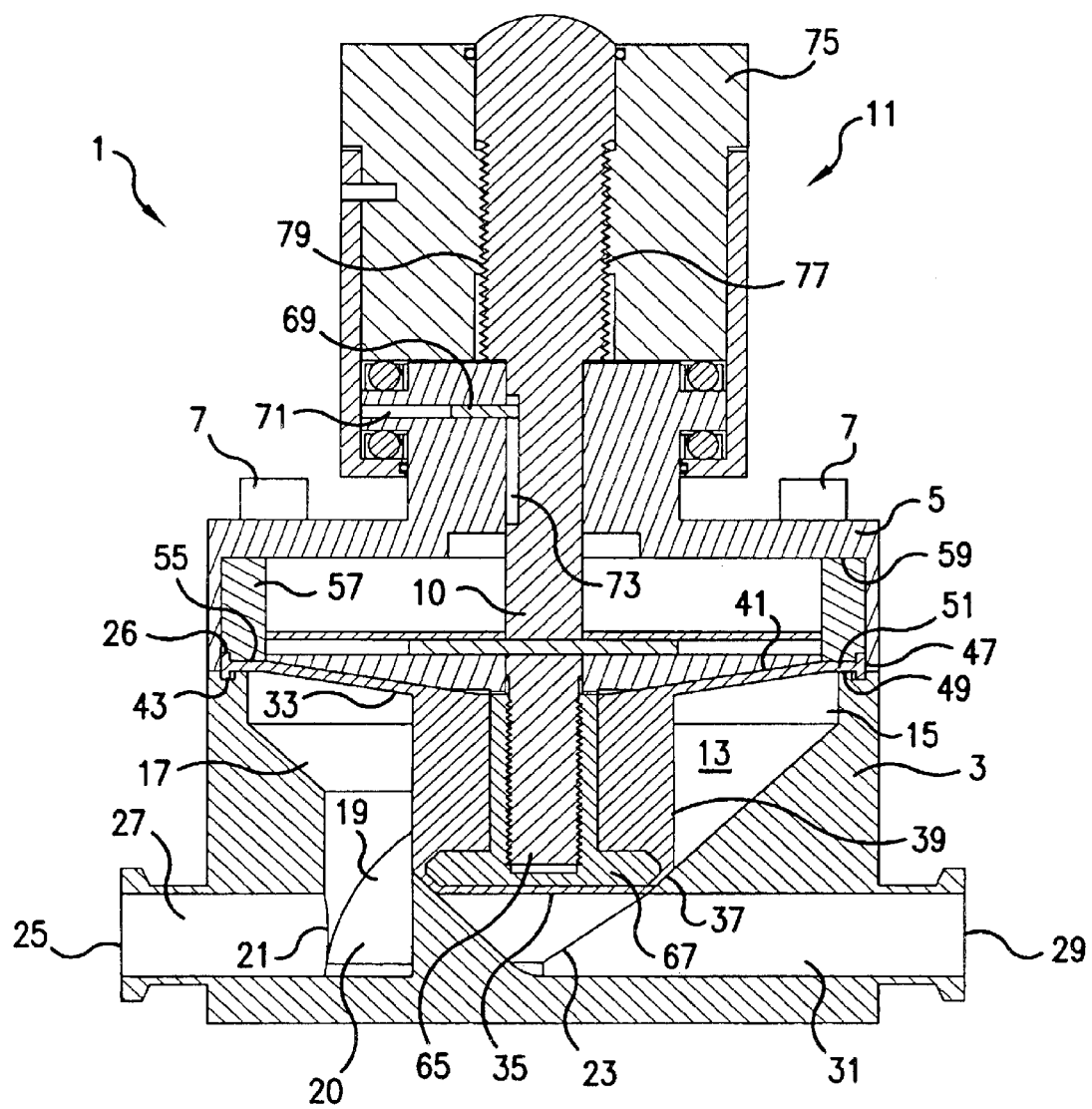
FIG. 1 is a vertical cross-section through the valve of the present invention illustrating the valve in an closed position.
Figure 2:
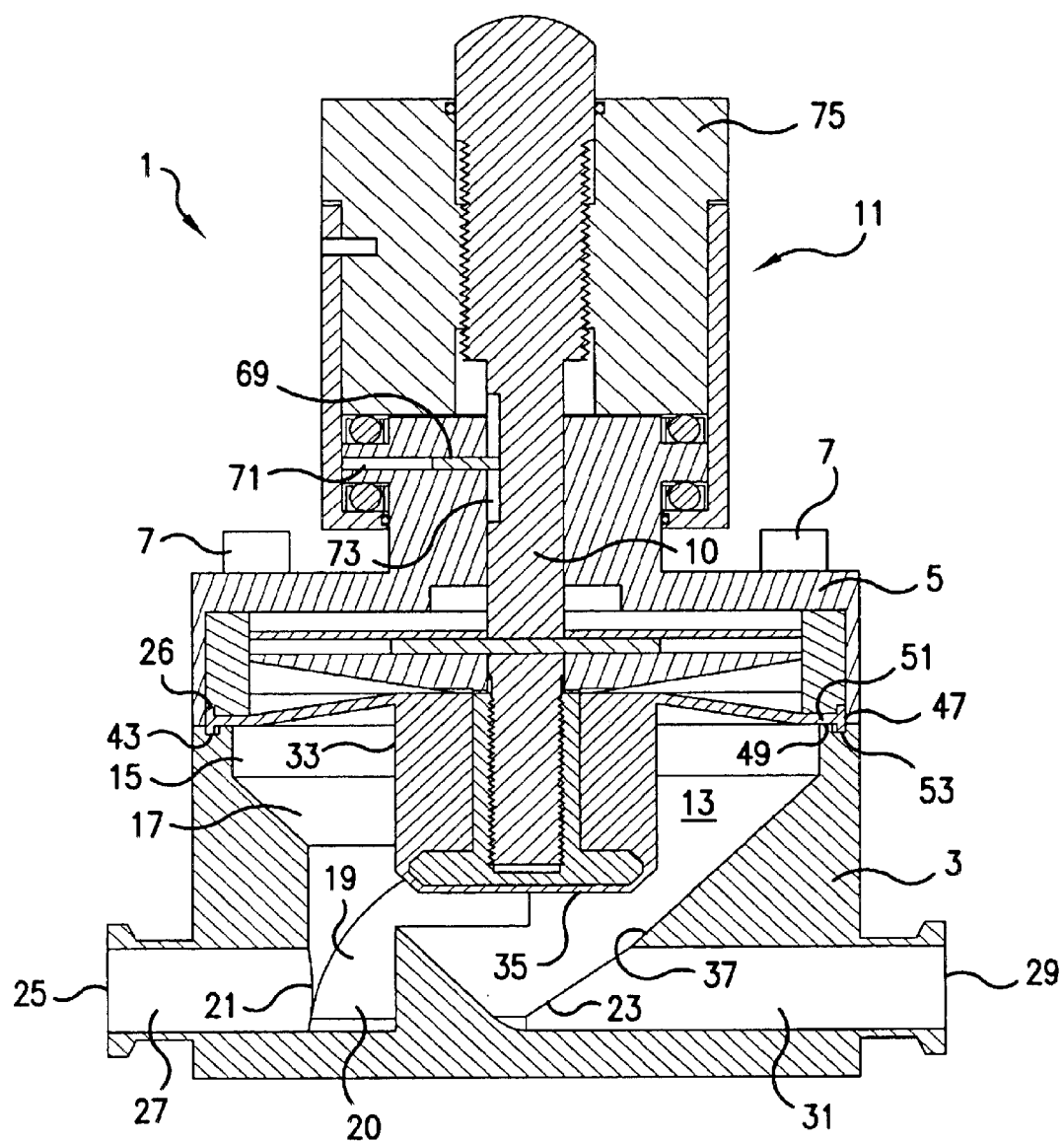
FIG. 2 is a vertical cross-section through the valve of the present invention illustrating the valve in a opened position.

The present invention will now be described with reference to the accompanying drawings. Referring to FIGS. 1–5, a first embodiment of the present invention will be described. FIGS. 1 and 2 are vertical cross-sections through the valve 1 of the present invention. FIG. 1 illustrates the valve in a closed position and FIG. 2 illustrates the valve in an open position.

The valve 1 includes a valve body 3 and a bonnet 5. The bonnet 5 can be connected to the valve body 3 through numerous types of mechanisms including clamps, etc. However, in FIGS. 1–5, the bonnet 5 is illustrated as being connected to the valve body 3 by a plurality of bolts 7 which extend into corresponding bolt holes 9 formed in the bonnet 5 and the valve body 3 (see FIG. 3).

The valve 1 also includes a valve actuator rod 10 mounted in the bonnet 5. In FIGS. 1 and 2, the valve actuator rod 10 is illustrated with a manual actuator 11 for opening and closing the valve. However, it should be understood that an automatic actuator, such as a pneumatic actuator could also used.

The structure of the valve body 3 of the present invention will now be described. The valve body 3 includes an internal cavity 13, an inlet passage 27, and an outlet passage 31 formed therein. A bottom line extending through the inlet passage 27, the internal cavity 13, and the outlet passage 31 forms a co-planar surface 20, when the valve body is cantilevered about an axis of the inlet passage 27. In the first embodiment of the present invention, the bottom line is formed by the co-planar surface 20 to form a continuous, smooth and uninterrupted flow line from the inlet 25 to the outlet 29, when the valve 1 is cantilevered to one side by 45°. This orientation of the valve 1 allows the valve 1 to be free-draining to the process side when the valve 1 is in an open position as illustrated in FIG. 2. It is also noted that in a typical system, the valve would be oriented to have to the inlet 25 slightly above the outlet 29 in order to assist in this free-draining.

In FIGS. 1–5, the valve 1 is illustrated as being a 45° degree valve, which would therefore be mounted such that the valve is cantilevered about the axis of the inlet passage 27 by 45°. However, it will be readily understood to one having ordinary skill in the art that the valve can be constructed in other ways as well, depending on the application. For example, the valve of the present invention can also be constructed as, for example, a 57° or 24° valve, which would require that the valve be mounted such that the valve is cantilevered about the axis of the inlet passage 27 by 57° and 24°, respectively.

Referring again to FIG. 1, a main portion of the internal cavity 13 includes a cylindrical portion 15 and a conical portion 17. However, it should be understood that the shape of the internal cavity 13 can be formed in other shapes as well. The valve body 3 may also include a channel 19, which is in communication with an inlet opening 21 of the inlet passage 27 and the main portion of the internal cavity 13. The inlet opening 21 is also in communication with an inlet 25 via the inlet passage 27. Furthermore, an outlet opening 23 of the outlet passage 31 is in communication with the main portion of the internal cavity 13. The outlet opening 23 is in communication with an outlet 29 via the outlet passage 31.

It should be noted that the terms "inlet" and "outlet" are used only to denote opposite sides of a circumferential sealing surface 37 formed in the internal cavity 13, which segregates the upstream from the downstream side of a process. However, the valve 1 of the present invention can be installed to have either the inlet 25 or the outlet 29 oriented toward the upstream side or downstream side of the process. In addition, a process may flow in one direction relative to the valve 1 in some instances, while in a second, opposite direction in other instances.

Referring again to FIG. 1 of the present invention, the valve 1 is illustrated in the closed position, while in FIG. 2, the valve 1 is illustrated in the open position. In order to keep the process side of the valve 1 isolated from the non-process side of the valve 1, a diaphragm 33 can be utilized. The diaphragm 33 includes a sealing tip 35, which is movable into and out of contact with a circumferential sealing surface 37 by the manual actuator 11. The diaphragm 33 also includes a forward extension 39, which may be undercut (not shown), allowing the flexible portion 41 of the diaphragm 33 a greater flexibility. Accordingly, the sealing tip 35 is allowed a greater range of travel and therefore a greater range of flow through the valve 1 can be achieved. The sealing tip of the diaphragm 33 may be conical or in the form of a truncated cone in order to cooperate with the circumferential sealing surface 37. Other embodiments of the invention are also possible, wherein diaphragm 33 has no forward extension other than to be designed as a large dimple in an otherwise flat diaphragm, a forward portion of the dimple mating and sealing with the circumferential sealing surface 37. However, it should be understood that the shape of the sealing tip can also be formed in other closed shapes. All that is required is that the sealing tip 35 and the circumferential sealing surface 37 cooperate with each other to form a seal about the circumference of the internal cavity 13.

The outer perimeter 47 of diaphragm 33 is generally round and may include one or more lips shown in the first embodiment with a forward lip 43 and a rearward lip 45, to help anchor the perimeter 47 of the diaphragm within the valve body 3. A forward annular wall 49 of the diaphragm 33 forms a static sealing surface with a rear wall 51 of the valve body 3. Forward lip 43 fits into a groove 53 formed within valve body 3.

The perimeter 47 of the diaphragm 33 is held in place by being pressed from behind by a forward face 55 of a compression ring 57. The compression ring 57 is pressed from behind by a forward face 59 of the bonnet 5. As mentioned above, the bonnet 5 is tightened down on the valve body 3 by, for example, bolts, clamps, etc., bolts 7 being illustrated in FIGS. 1–5.

Rotating the manual actuator 11 will cause the valve actuator rod 10 to be reversibly retracted from the closed or sealing position. The forward end 65 of the valve actuator rod 10 is affixed to an insert 67 in the diaphragm 33. This causes the sealing tip 35 of the diaphragm 33 to mate with the circumferential sealing surface 37 of the valve body 3 about the outlet opening 23 of the outlet passage 31. A pin 69 is pressed into a hole 71 in the bonnet 5. The pin 69 protrudes into a slot 73 formed in the valve actuator rod 10, keeping it from rotating as the knob 75 of the manual actuator 11 is rotated. Accordingly, the female threads 77 formed in the knob assembly 75 force the male threads 79 formed on the valve actuator rod 10 to retract the valve actuator rod 10 and the attached sealing tip 35, thus opening the valve 1, as illustrated in FIG. 2.

Figure 3:
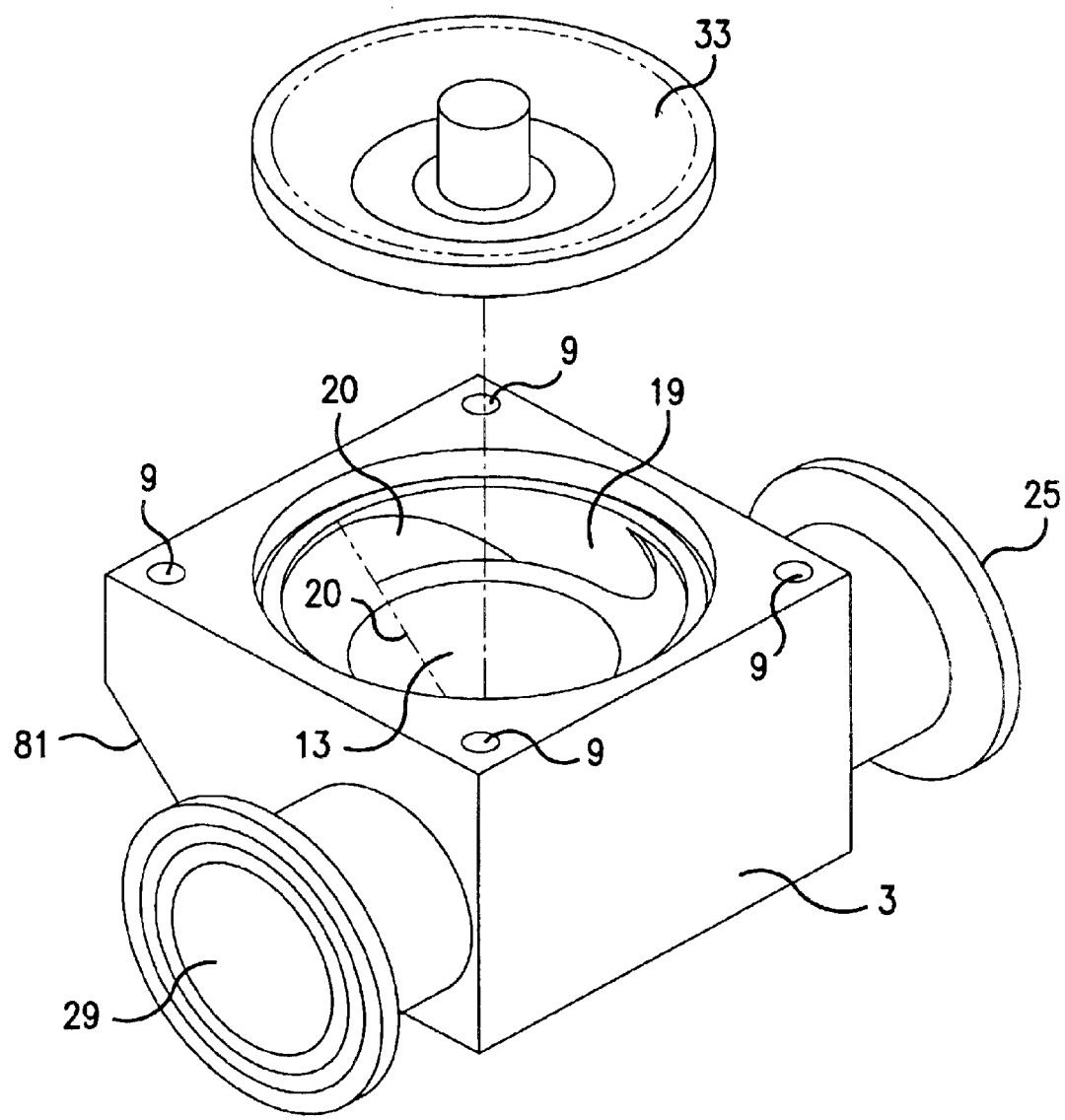
FIG. 3 is a perspective view of the valve body and diaphragm of the present invention according to one embodiment of the present invention.

Referring to FIG. 3 of the present invention, a perspective view of the valve 1 is illustrated. In FIG. 3, the axis of the inlet passage 27 and outlet passage 31 are offset from a center of the valve body 3. Accordingly, while the valve can be operated in many orientations, this embodiment can be made to have a continuous, smooth and uninterrupted horizontal flow line from the inlet 25 to the outlet 29 when the axis through the inlet 25 and outlet 29 is horizontal and when the valve is also cantilevered to one side about an axis of the inlet passage 27. In this particular case, the valve would be cantilevered by 45°. In order to aid in orienting the valve body 3 when in a system, an angled surface 81 can be formed on the outside surface of the valve body 3. This forms a sight line, which can be used to ensure that the valve 1 is positioned properly within a system. When the angled surface 81 is located parallel to a horizontal plane, the bottom line is formed by the co-planar surface 20 to form a continuous, smooth and uninterrupted flow line from the inlet 25 to the outlet 29. Accordingly, the angled surface 81 should be constructed to be parallel to the co-planar surface 20, but spaced therefrom. It should also be noted that the angled surface 81 can also be angled to assist the flow through the valve 1 from the inlet 25 to outlet 29, as mentioned earlier.

In FIG. 3, the channel 19 is clearly shown in its preferred form, wherein a smooth transition from the inlet opening 21 is formed. The dashed line in FIG. 3 illustrates the flow path between the channel 19 and the outlet opening 23. As can be clearly understood, when this dashed line is oriented parallel to a horizontal plane, the flowpathway would be parallel to the outer perimeter of the conical surface formed by the conical portion 17 of the internal cavity 13. To be put another way, when this dashed line is oriented parallel to a horizontal plane, the flow path along the bottom of channel 19 would be coplanar with the outer perimeter of the conical surface where the two meet. Also, a line extending from the cone perimeter toward what would be the cone's apex, a point within outlet opening 23, would also be coplanar. Accordingly, the flow crosses the circumferential seal formed between the circumferential sealing surface 37 and the sealing tip 35 of the diaphragm 33.

Figure 4A:
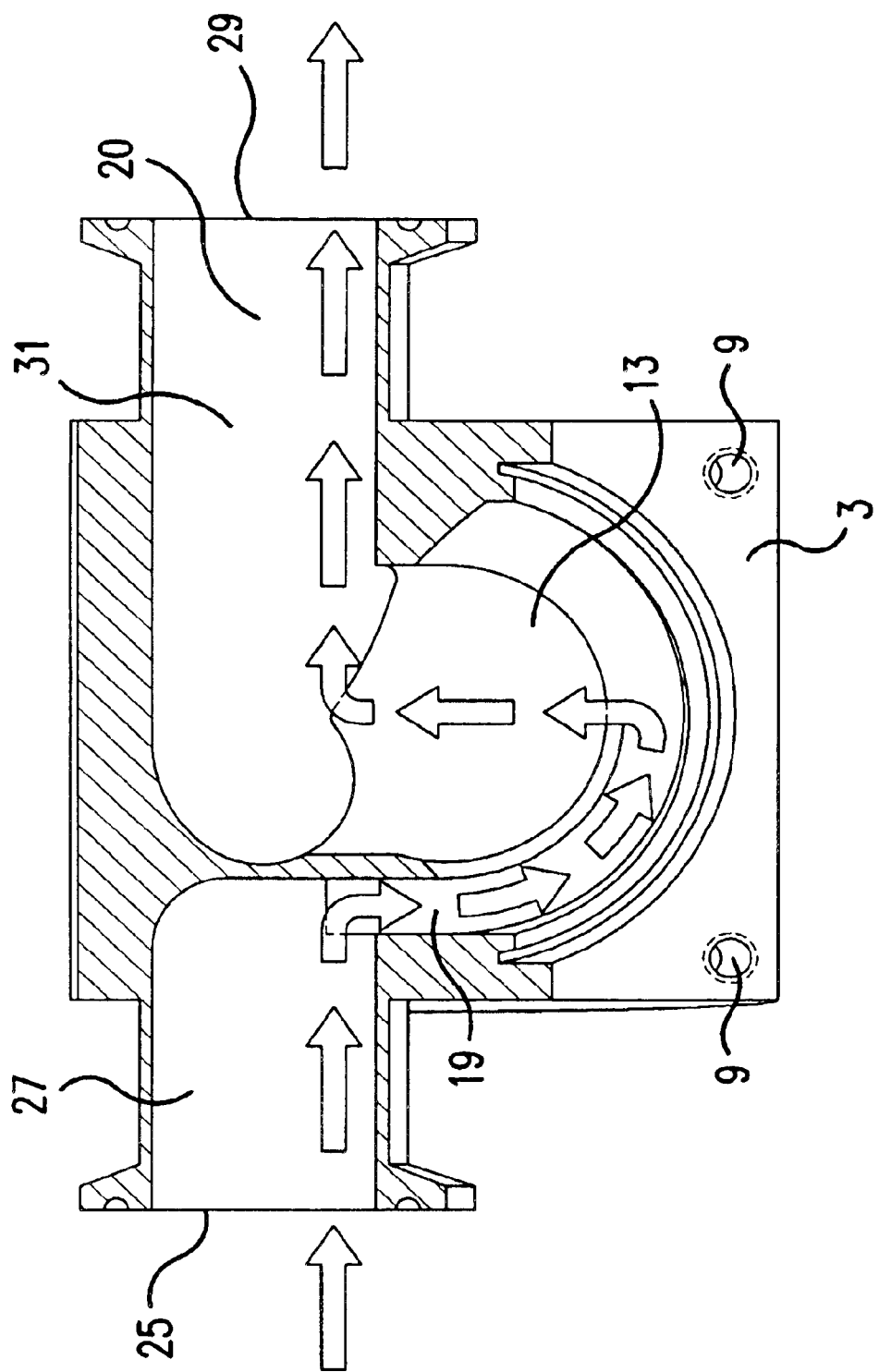
FIG. 4A is a horizontal cross-section of the valve at a mid-height of the inlet and outlet when the valve is positioned for operation which, in the case of this valve (same as illustrated FIG. 3) is cantilevered onto its side at an angle of 45° to the horizontal.
Figure 4B:
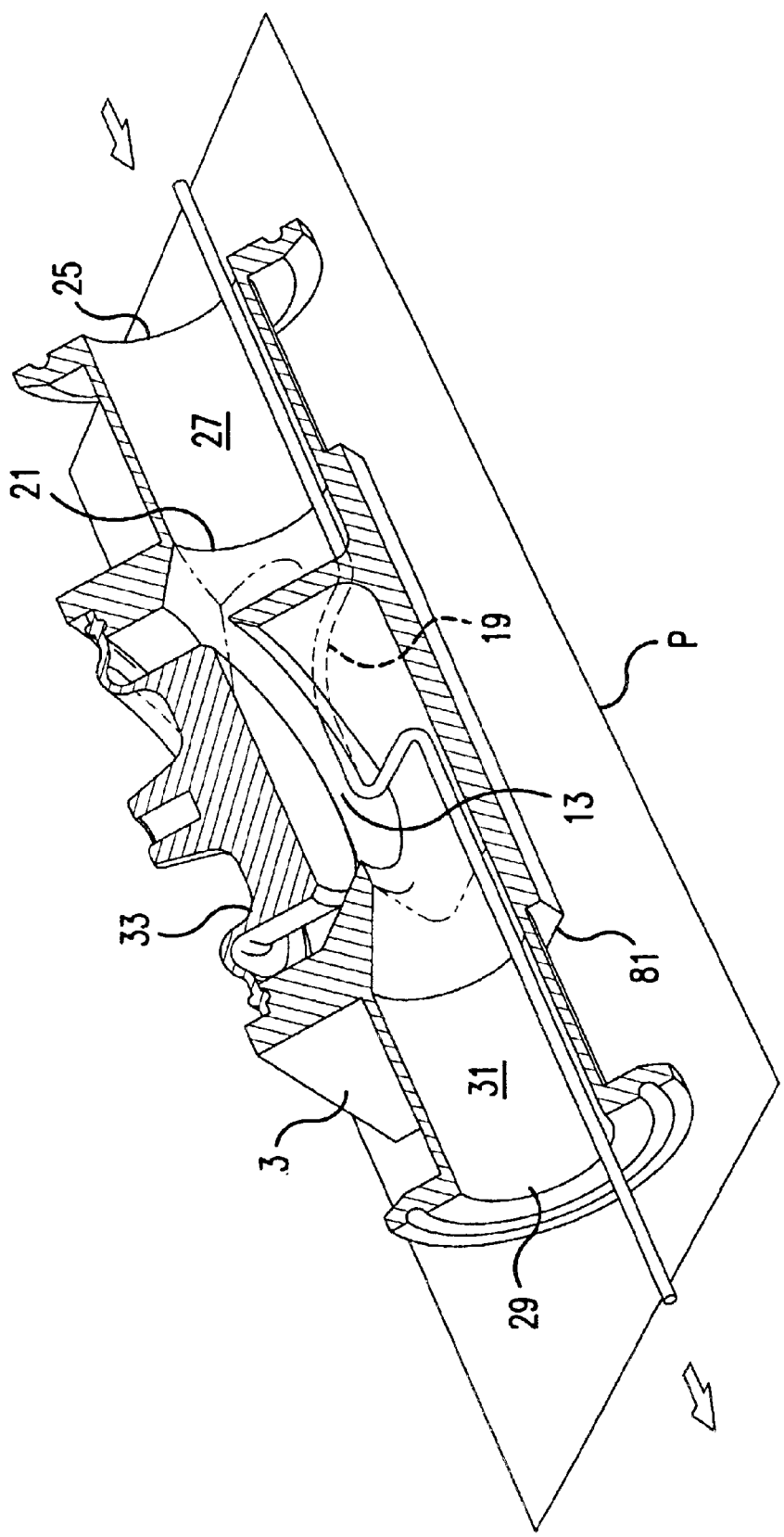
FIG. 4B is a cross-section through the valve of FIG. 3 along a center of the diaphragm.

Referring to FIGS. 4A and 4B of the present invention, the flow through the valve 1 will be explained. As mentioned above, the flow through the valve 1 allows for free-draining of the valve from the inlet 25 to the outlet 29 when the valve is in an open position as illustrated in FIG. 2. In FIG. 4A, the flow through the valve is illustrated by arrows, while in FIG. 4B, the flow through the valve is illustrated by a pair of arrows and a flow line. As can be clearly understood, the flow enters through inlet 25 and continues through inlet passage 27, inlet opening 21, channel 19 of the internal cavity 13, outlet opening 23, outlet passage 31 and outlet 29 in turn.

FIG. 4A is a cross-section through the valve body 3 of FIG. 3 along a plane parallel to the co-planar surface 20. FIG. 4B is a cross-section through the valve body 3 of FIG. 3 through a center of the diaphragm 33. As can be clearly understood, a continuous flow through the valve is formed, since the bottom line of the inlet passage 27, the internal cavity 13, and the outlet passage 31 form the co-planar surface 20 when the valve is cantilevered about the axis of the inlet passage 27 to orient the co-planar surface parallel to a horizontal plane. As mentioned above, the valve 1 on the first embodiment should be canitlevered by 45°.

Referring again to FIG. 4B, the value body is illustrated as resting on an imaginary plane P, which is parallel to the angled surface 81. When the valve body 3 is in this orientation, a bottom line extending through the inlet passage 27, the internal cavity 13 and the outlet passage 31 forms a coplanar, horizontal surface to allow for free drainage of the value body 3. In other words, when the value body 3 is oriented as illustrated in FIG. 4B, a bottom most surface of the inlet passage 31, the channel 19 of the internal cavity 13 and the outlet passage 31 form coplanar, horizontal surface which allows material within the system to flow from the inlet 25 to the outlet 29 without obstruction.

In FIGS. 3, 4A and 4B of the present invention, the axis of the inlet passage 27 and the outlet passage 31 are offset to one side of the valve body 1. It should be noted; however, that the inlet passage 27 and the outlet passage 31 may also be constructed to pass through a center of the valve body 3. With this construction, the valve 1 may be bi-laterally constructed so that the valve 1 can be used in either a right-handed or left-handed orientation. However, it should be understood that depending on whether the valve 1 is to be used as a right-handed valve or a left-handed valve, the valve would be cantilevered about the axis of the inlet passage 27 and outlet passage 31 to the right side or left side, respectively.

Figure 5:
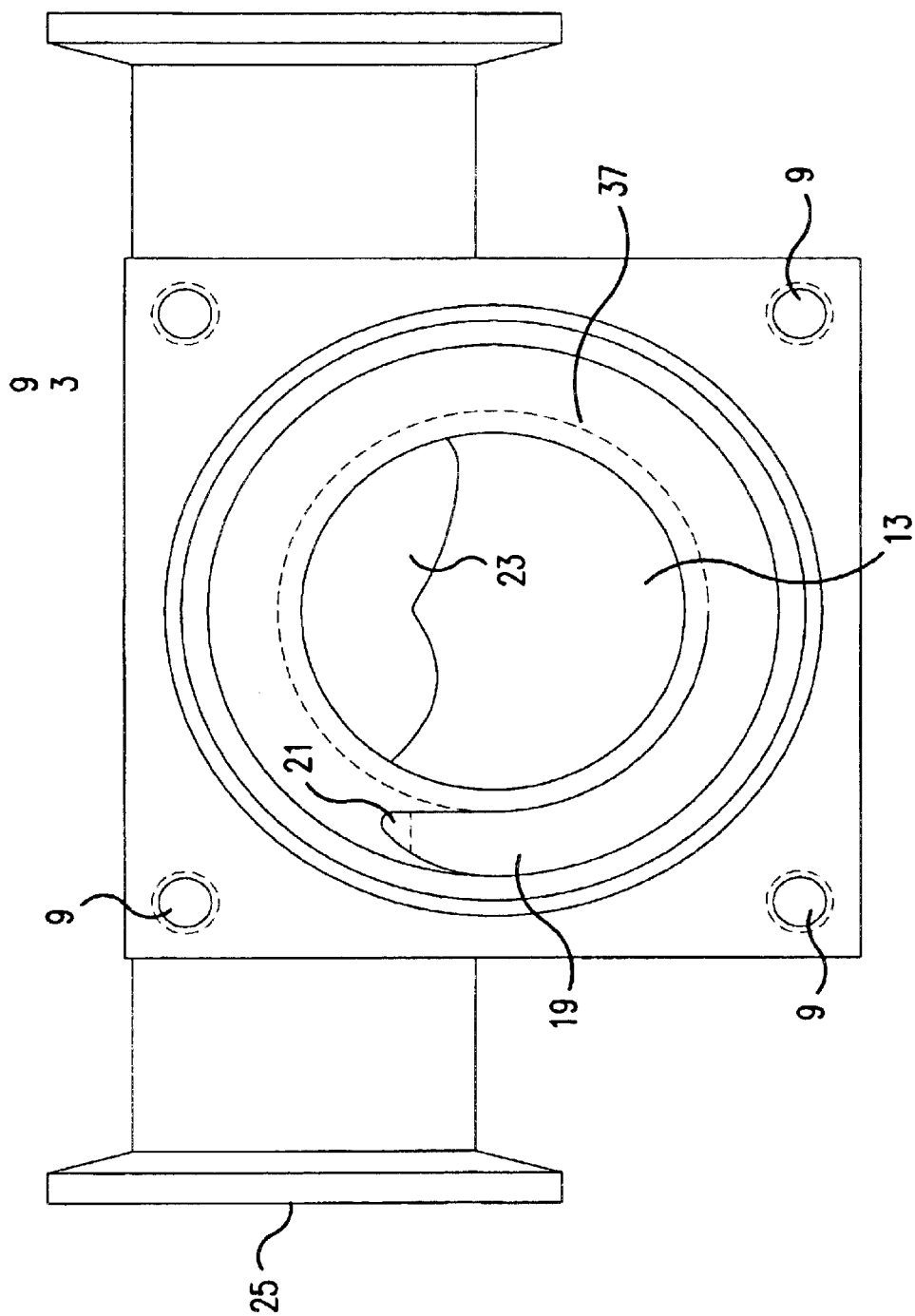
FIG. 5 is a top plan view of the valve of FIG. 3.

Referring to FIG. 5 of the present invention, the circumferential sealing surface 37 is clearly illustrated as being formed by a circle, which extends around a perimeter of the internal cavity 13. It should be noted; however, that as mentioned above, the circumferential sealing surface 37 need not be formed in the shape of a circle, but could be formed in any other closed shape as long as the circumferential sealing surface 37 extends 360° around the internal cavity 13.

In FIG. 5, the flow proceeds as explained above from the inlet 25 through the inlet passage 27 to the inlet opening 21, and then proceeds through the channel 19, along the surface of the conical portion 17 to the outlet opening 23, and then proceeds through the outlet passage 31 to the outlet 29. Although the valve of the present invention has been described as having a conical portion 17 and a channel 19 in the internal cavity 13, it should be readily understood to one having ordinary skill in the art that only the smooth transition between the inlet opening 21 and the outlet opening 23 need be provided. Accordingly, the internal cavity 13 can be formed in other shapes as well.

Figure 6:
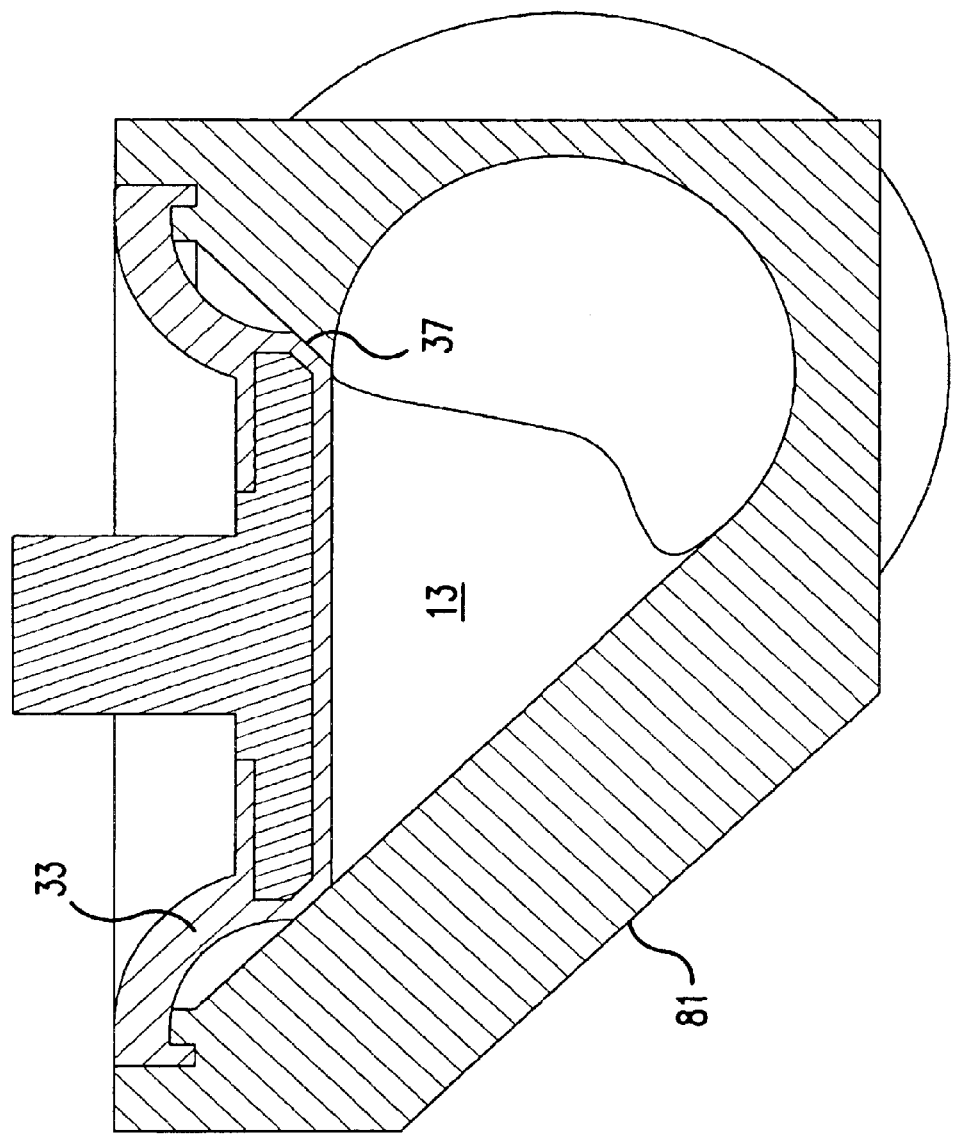
FIG. 6 is a vertical cross-section of the valve of FIG. 3.

Referring to FIG. 6 of the present invention, a close-up view of an alternative arrangement of the diaphragm 33 is illustrated. In this embodiment, the diaphragm 33 has a much shorter forward extension 39, which would allow for less range of movement in retracting the sealing tip 35 from the mating circumferential sealing surface 37 but could significantly reduce the internal volume of the valve body 3 allowing the valve 1 to be more compact while assisting to redirect flow through the internal cavity 13 to achieve optimal throughflow efficiency. As with any valve, overextending valve operating components and associated seal elements can cause the valve to operate suboptimally. In this case, without travel stops it would affect the static seal formed by the valve body 3 and the perimeter 47 of the diaphragm 33 by causing the diaphragm 33 to separate from body 3 along a static seal formed between forward annular wall 49 and rear wall 51. Such over extension would create a temporary pocket where material could collect and result in the kind of cross contamination problems currently seen with weir-style diaphragm valves. As mentioned above, the flexibility of the diaphragm portion between the circumferential sealing surface 37, which forms a dynamic seal, and the forward annular wall 49 of diaphragm 33, which forms the static seal between the valve body 3 and the perimeter 47 of the diaphragm 33, is important since too little separation and/or too stiff a material may cause the transfer of movement of the dynamic sealing portion of the diaphragm to the portion which should remain static. In this embodiment, the diaphragm travel is more limited than in the embodiment shown FIG. 2, but flow through the valve body would be relatively higher and more efficient, since the cross section of inlet opening 21 and outlet opening 23 are greater relative to the size of the internal valve cavity. When considered with the fact that there is little travel necessary to move the valve from the open to the closed position, and that there is less internal surface area, this combination of attributes is highly desirable and advantageous. When operated within design specifications this design avoids the problems of the background art valves, which experience accumulation of material around the static seal of the valve.

Figure 7:
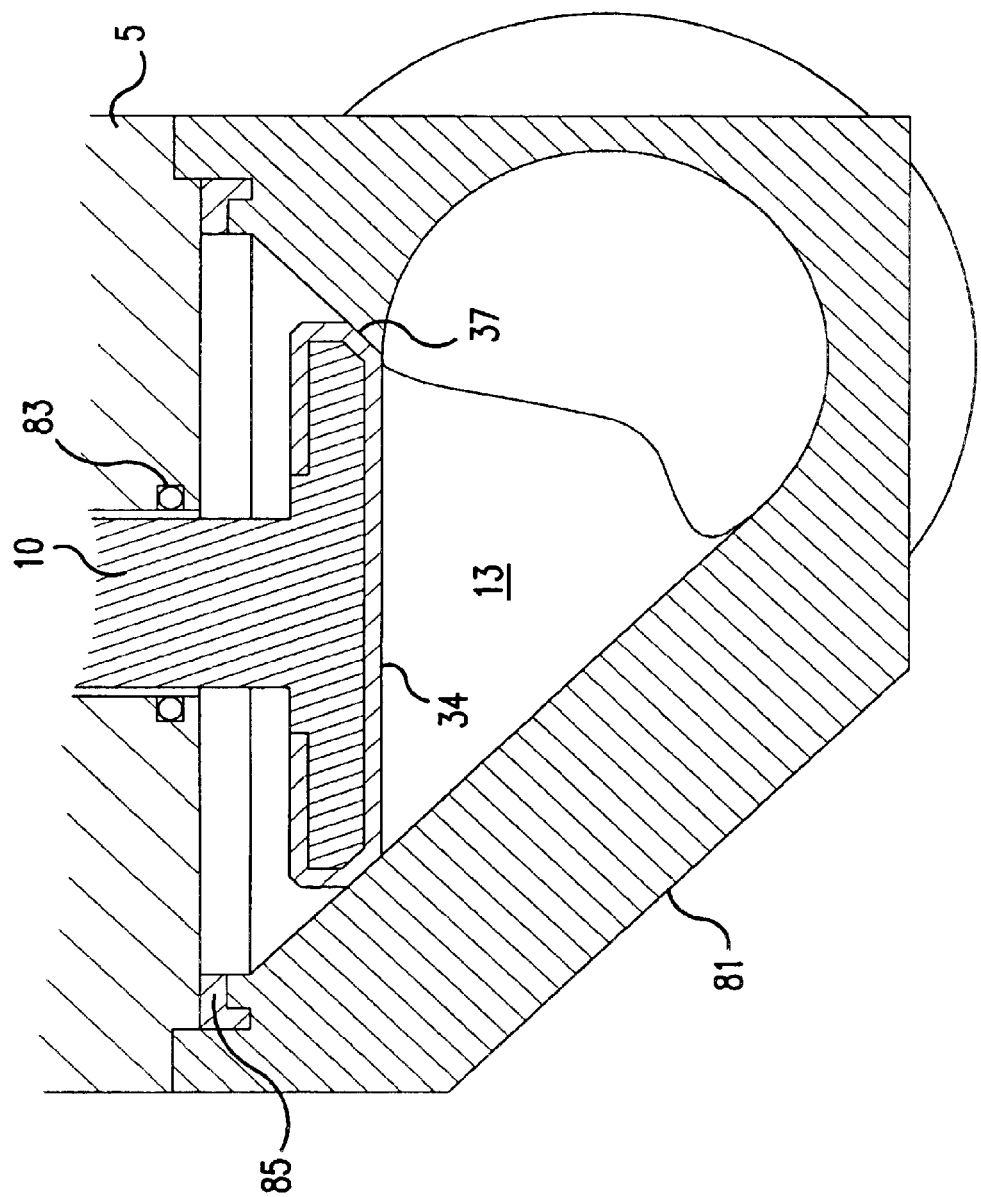
FIG. 7 is a vertical cross-section similar to FIG. 6 illustrating an alternative embodiment of the valve according to the present invention.

As an alternative arrangement, FIG. 7 of the present invention illustrates an o-ring 83, which seals between the valve actuator rod 10 and the bonnet 5. Also provided is a static annular seal 85 between the bonnet 5 and the valve body 3 and a dynamic seal between the circumferential sealing surface 37 and the sealing tip 34 attached to the actuator rod 10. This arrangement would provide no pressure on the static seal between the valve body 3 and the bonnet 5 during operation of the valve 1. Accordingly, material being caught in the space formed between the valve body 3 and the bonnet 5 can be reduced substantially.

Figure 8:
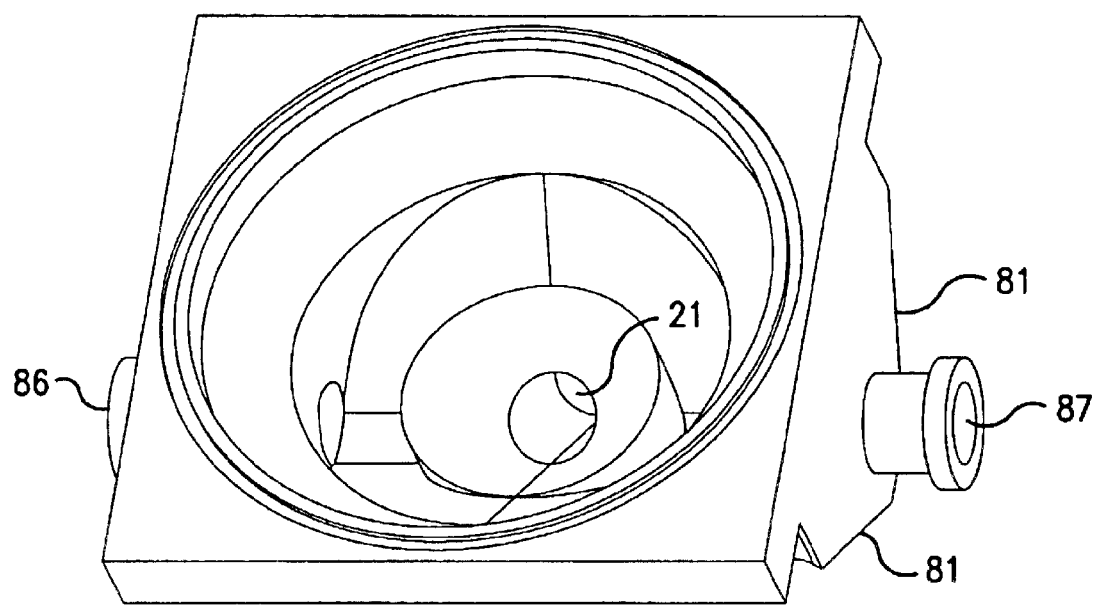
FIG. 8 is a perspective view of an alternative embodiment of the valve of present invention.
Figure 9:
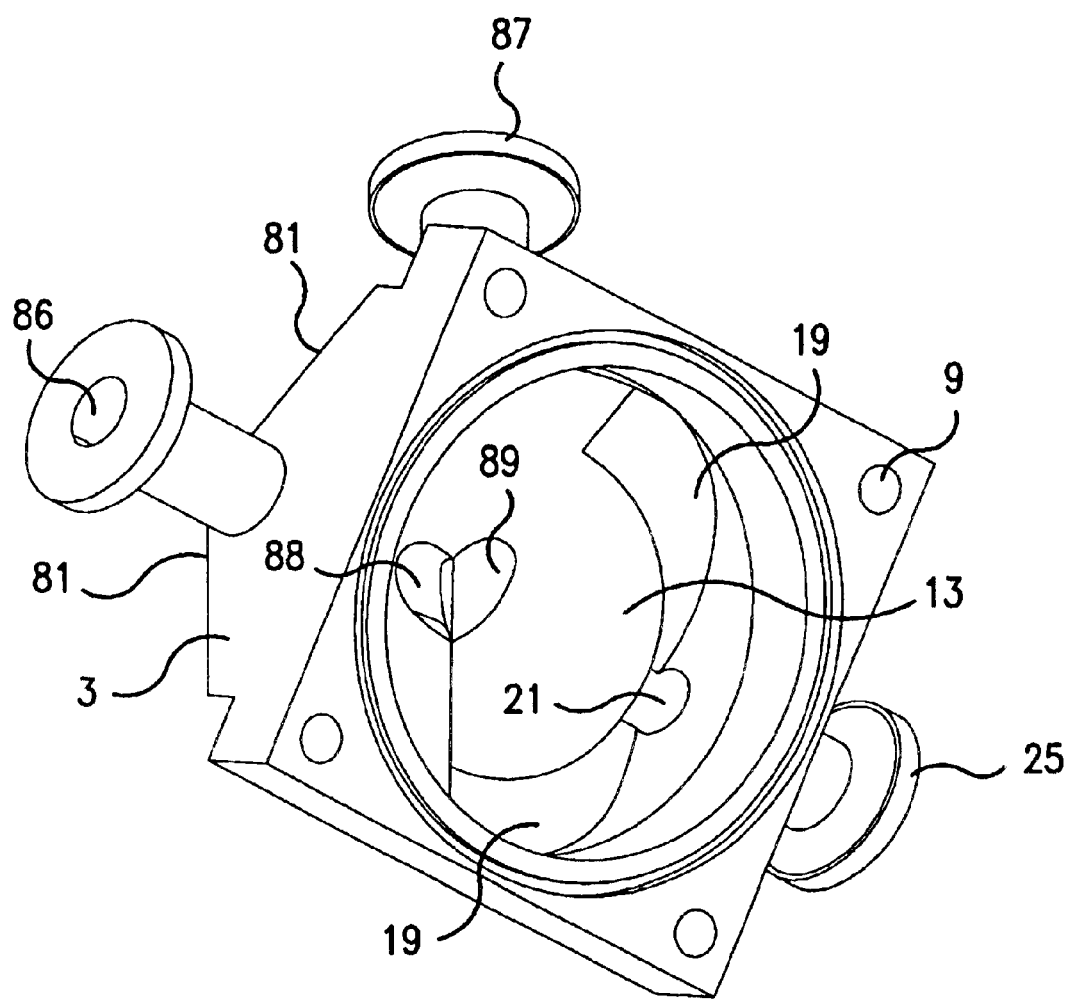
FIG. 9 is a perspective view of an alternative embodiment of the valve of the present invention.
Figure 10:
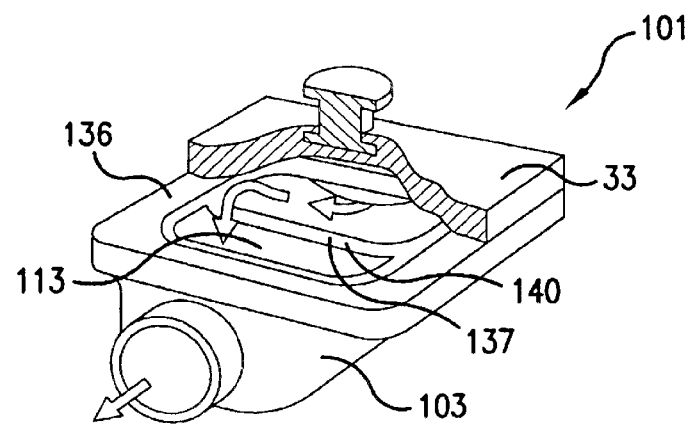
FIG. 10 is a perspective view of a valve according to the background art.
Figure 11:
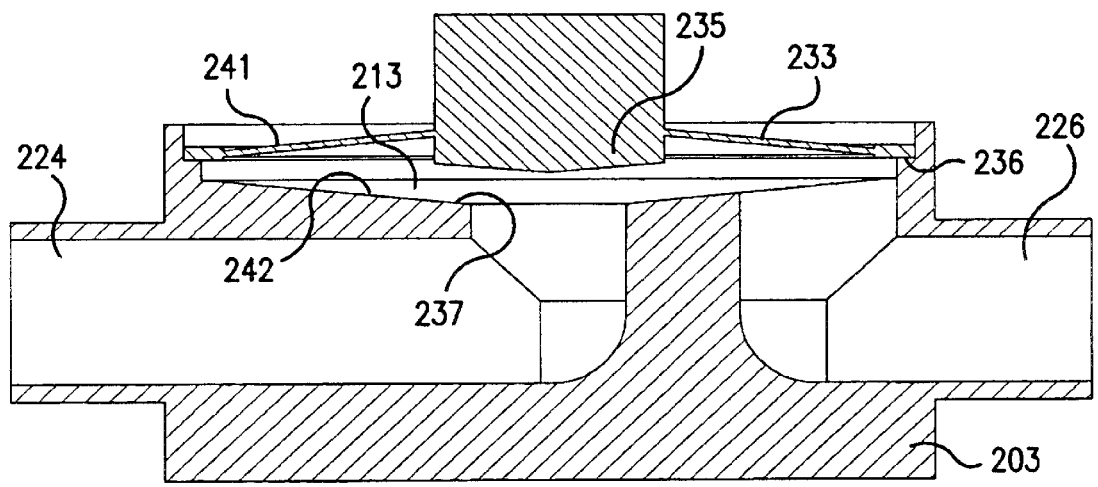
FIG. 11 is a cross-section of a valve according to the background art.

Referring to FIGS. 8 and 9 of the present invention, two embodiments of three-way valve are illustrated. In FIGS. 8 and 9, when the valve 1 is in the closed position, the inlet 25 is sealed off. However, flow is allowed to continue between the inlet 86 and the outlet 87. It should be understood that the inlet 86 and the outlet 87 can be opened and closed upstream and downstream, respectively, by an additional valve 1 of the present invention or another type of valve in the system. When it is desired to provide flow between the inlet 25 and the inlet 86 and the outlet 87, one of the inlet 86 and the outlet 87 is closed and the sealing tip 35 is brought away from the circumferential sealing surface 37 in order to allow communication therebetween.

It should be noted that FIGS. 8 and 9 are similar embodiments. However, the difference between the embodiments of FIGS. 8 and 9 is the fact that the flow through the valve 1 in the closed position is straight in the embodiment of FIG. 8, while the flow through the valve 1 in FIG. 9 is at an angle of 90°. In addition, the embodiment of FIG. 8 illustrates four channels 19 formed in the internal cavity 13, while FIG. 9 illustrates two channels 19. In FIG. 9, the inlet opening 88 and the outlet opening 89 are illustrated as being adjacent to each other.

Both of the embodiments of FIGS. 8 and 9 are 30° valves and include two angled surfaces 81, which aid in the positioning of the valve 1 in a system, depending on whether the valve 1 is used in a right-hand orientation or a left-hand orientation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A valve body for a valve, comprising:

a body;

an internal cavity formed in said body;

an inlet passage formed in said body, said inlet passage having an inlet opening, said inlet opening being in communication with said internal cavity;

an outlet passage formed in said body, said outlet passage having an outlet opening, said outlet opening being in communication with said internal cavity; and a circumferential sealing surface formed on a wall of said internal cavity, said circumferential sealing surface sealing between said inlet opening and said outlet opening and circumferentially around said internal cavity, wherein a bottom line extending through said inlet passage, said internal cavity and said outlet passage forms a coplanar, horizontal surface to allow for free-drainage of said body.

2. The valve body according to claim 1, said internal cavity further comprising:

a main cavity; and a channel formed between said inlet opening and said main cavity.

3. The valve body according to claim 1, wherein said bottom line of said internal cavity is not co-axial with an axis of said inlet passage.

4. The valve body according to claim 2, wherein said bottom line of said internal cavity is not co-axial with an axis of said inlet passage.

5. The valve body according to claim 1, wherein said internal cavity further comprises a conical portion, said circumferential sealing surface being formed around a circumference of said conical portion.

6. The valve body according to claim 1, wherein said circumferential sealing surface is a first circumferential sealing surface, said valve body further comprising a second circumferential sealing surface, said second circumferential sealing surface extending entirely around an opening of said internal cavity.

7. A valve, comprising:
a valve body, said valve body comprising:
an internal cavity formed in said body;
an inlet passage formed in said body, said inlet passage having an inlet opening, said inlet opening being in communication with said internal cavity;
an outlet passage formed in said body, said outlet passage having an outlet opening, said outlet opening being in communication with said internal cavity; and
a circumferential sealing surface formed on a wall of said internal cavity, said circumferential sealing surface sealing between said inlet opening and said outlet opening and circumferentially around said internal cavity,
wherein a bottom line extending through said inlet passage, said internal cavity and said outlet passage forms a coplanar, horizontal surface to allow for free-drainage of said body;
a bonnet, said bonnet being mounted to a top of said valve body to cover said internal cavity; and
a valve actuator rod supported by said bonnet, said actuator rod including a sealing tip on one end thereof for cooperating with said circumferential sealing surface to open and close communication between said inlet passage and said outlet passage.

8. The valve according to claim 7, said internal cavity further comprising:
a main cavity; and
a channel formed between said inlet opening and said main cavity.

9. The valve according to claim 7, wherein a vertical plane extending through an axis of said inlet passage and parallel thereto is not coplanar with an axis of said valve actuator rod.

10. The valve according to claim 8, wherein a vertical plane extending through an axis of said inlet passage and parallel thereto is not coplanar with an axis of said valve actuator rod.

11. The valve according to claim 7, wherein said bottom line of said internal cavity is not co-axial with an axis of said inlet passage.

12. The valve according to claim 8, wherein said bottom line of said internal cavity is not co-axial with an axis of said inlet passage.

13. The valve according to claim 7, further comprising a static seal between said bonnet and said valve body, said static seal being formed by a perimeter of a diaphragm, said diaphragm extending between said static seal and said sealing tip to seal said internal cavity from a valve actuator of said valve actuator rod.

14. The valve according to claim 7, further comprising:
a static seal between said bonnet and said valve body;
a dynamic seal between said bonnet and said valve actuator rod to seal said internal cavity from a valve actuator of said valve actuator rod.

15. The valve according to claim 7, wherein said internal cavity further comprises a conical portion, said circumferential sealing surface being formed around a circumference of said conical portion.

16. The valve body according to claim 7, wherein said circumferential sealing surface is a first circumferential sealing surface, said valve body further comprising a second circumferential sealing surface, said second circumferential sealing surface extending entirely around an opening of said internal cavity.

17. A valve body for a valve, comprising:
a body;
an internal cavity formed in said body;
an inlet passage formed in said body, said inlet passage having an inlet opening, said inlet opening being in communication with said internal cavity;
an outlet passage formed in said body, said outlet passage having an outlet opening, said outlet opening being in communication with said internal cavity; and
a circumferential sealing surface formed on a wall of said internal cavity, said circumferential sealing surface sealing between said inlet opening and said outlet opening and circumferentially around said internal cavity,
wherein a bottom surface of said body forms a continuous, co-planar, horizontal path from an inlet of said inlet passage to an outlet of said outlet passage to allow for free-drainage of said body.

18. The valve body according to claim 17, said internal cavity further comprising:
a main cavity; and
a channel formed between said inlet opening and said main cavity.

19. The valve body according to claim 17, wherein at least a portion of said continuous, co-planar, horizontal path extending through said internal cavity is not co-axial with an axis of said inlet passage.

20. The valve body according to claim 18, wherein at least a portion of said continuous, co-planar, horizontal path extending through said internal cavity is not co-axial with an axis of said inlet passage.

21. The valve body according to claim 17, wherein said internal cavity further comprises a conical portion, said circumferential sealing surface being formed around a circumference of said conical portion.

22. The valve body according to claim 17, wherein said circumferential sealing surface is a first circumferential sealing surface, said valve body further comprising a second circumferential sealing surface, said second circumferential sealing surface extending entirely around an opening of said internal cavity.

23. A valve, comprising:
a valve body, said valve body comprising:
an internal cavity formed in said body;
an inlet passage formed in said body, said inlet passage having an inlet opening, said inlet opening being in communication with said internal cavity;
an outlet passage formed in said body, said outlet passage having an outlet opening, said outlet opening being in communication with said internal cavity; and a circumferential sealing surface formed on a wall of said internal cavity, said circumferential sealing surface sealing between said inlet opening and said outlet opening and circumferentially around said internal cavity, wherein a bottom surface of said body forms a continuous, co-planar, horizontal path from an inlet of said inlet passage to an outlet of said outlet passage to allow for free-drainage of said body;

a bonnet, said bonnet being mounted to a top of said valve body to cover said internal cavity; and a valve actuator rod supported by said bonnet, said actuator rod including a sealing tip on one end thereof for cooperating with said circumferential sealing surface to open and close communication between said inlet passage and said outlet passage.

24. The valve according to claim 23, said internal cavity further comprising:

a main cavity; and a channel formed between said inlet opening and said main cavity.

25. The valve according to claim 23, wherein a vertical plane extending through an axis of said inlet passage and parallel thereto is not coplanar with an axis of said valve actuator rod.

26. The valve according to claim 24, wherein a vertical plane extending through an axis of said inlet passage and parallel thereto is not coplanar with an axis of said valve actuator rod.

27. The valve according to claim 23, wherein at least a portion of said continuous, co-planar, horizontal path extending through said internal cavity is not co-axial with an axis of said inlet passage.

28. The valve according to claim 24, wherein at least a portion of said continuous, co-planar, horizontal path extending through said internal cavity is not co-axial with an axis of said inlet passage.

29. The valve according to claim 23, further comprising a static seal between said bonnet and said valve body, said static seal being formed by a perimeter of a diaphragm, said diaphragm extending between said static seal and said sealing tip to seal said internal cavity from a valve actuator of said valve actuator rod.

30. The valve according to claim 23, further comprising:

a static seal between said bonnet and said valve body;

a dynamic seal between said bonnet and said valve actuator rod to seal said internal cavity from a valve actuator of said valve actuator rod.

31. The valve according to claim 23, wherein said internal cavity further comprises a conical portion, said circumferential sealing surface being formed around a circumference of said conical portion.

32. The valve body according to claim 23, wherein said circumferential sealing surface is a first circumferential sealing surface, said valve body further comprising a second circumferential sealing surface, said second circumferential sealing surface extending entirely around an opening of said internal cavity.

33. A valve body for a valve, comprising:

a body;

an internal cavity formed in said body;

an inlet passage formed in said body, said inlet passage having an inlet opening, said inlet opening being in communication with said internal cavity;

an outlet passage formed in said body, said outlet passage having an outlet opening, said outlet opening being in communication with said internal cavity; and a circumferential sealing surface formed on a wall of said internal cavity, said circumferential sealing surface sealing around a perimeter of said outlet opening, wherein a bottom surface of said body forms a continuous, co-planar, horizontal path from said inlet opening of said inlet passage to said outlet opening of said outlet passage to allow for free-drainage of said body.

34. The valve body according to claim 33, said internal cavity further comprising:

a main cavity; and a channel formed between said inlet opening and said main cavity.

35. The valve body according to claim 33, wherein said internal cavity further comprises a conical portion, said circumferential sealing surface being formed around a circumference of said conical portion.

36. The valve body according to claim 33, wherein said circumferential sealing surface is a first circumferential sealing surface, said valve body further comprising a second circumferential sealing surface, said second circumferential sealing surface extending entirely around an opening of said internal cavity.

* * * * *